(12) United States Patent
Chien

(10) Patent No.: US 8,402,609 B2
(45) Date of Patent: Mar. 26, 2013

(54) SELF-LOCK HINGE

(75) Inventor: Hsiang-Chi Chien, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 618 days.

(21) Appl. No.: 12/650,880

(22) Filed: Dec. 31, 2009

(65) Prior Publication Data

US 2011/0154614 A1  Jun. 30, 2011

(51) Int. Cl.
*E05C 17/64* (2006.01)
(52) U.S. Cl. .................. 16/342; 16/374; 16/381; 16/386
(58) Field of Classification Search .................. 16/297, 16/342, 355, 356, 359, 374, 380–381, 386
See application file for complete search history.

(56) References Cited

U.S. PATENT DOCUMENTS

| 5,632,066 | A | * | 5/1997 | Huong | 16/338 |
| 5,950,281 | A | * | 9/1999 | Lu | 16/342 |
| 6,584,646 | B2 | * | 7/2003 | Fujita | 16/342 |
| 6,711,782 | B1 | * | 3/2004 | Su | 16/342 |
| 2003/0126720 | A1 | * | 7/2003 | Huang | 16/342 |
| 2006/0137142 | A1 | * | 6/2006 | Qin et al. | 16/342 |
| 2007/0119026 | A1 | * | 5/2007 | Lee et al. | 16/342 |
| 2007/0169314 | A1 | * | 7/2007 | Lee et al. | 16/342 |

* cited by examiner

*Primary Examiner* — Roberta Delisle
(74) *Attorney, Agent, or Firm* — Alan Kamrath; Kamrath IP Lawfirm, P.A.

(57) ABSTRACT

A self-lock hinge is mounted between a cover and a base of an electronic device and has a resilient sleeve and a pintle. The resilient sleeve has a tubular body with a positioning protrusion formed on an inside wall thereof. The pintle has a rod. The rod is mounted rotatably through the tubular body and has a flat wall selectively abutting the positioning protrusion. When the cover is closed relative to the base, the flat wall of the rod abuts the positioning protrusion to lock the cover. Therefore, the cover is self-locked when closing.

12 Claims, 19 Drawing Sheets

SELF-LOCK HINGE

BACKGROUND OF THE INVENTION

1. Field of the Invention

The present invention relates to a self-lock hinge and, especially, to a self-lock hinge mounted between a cover and a base of an electronic device to allow pivoting.

2. Description of the Prior Arts

Electronic devices such as notebook computers and cell phones are widely used. A conventional hinge is mounted between a cover and a base of an electronic device to allow the cover to pivot relative to the base. When the cover is closed relative to the base, a lock mechanism fastens the cover and the base to keep the cover from accidentally opening relative to the base. However, as the electronic devices provide more and more functions, the electronic devices need more and more inside room for accommodating the electrical components. The lock mechanism occupies space for the electrical components. Further, manufacturing the lock mechanism also increases the cost.

To overcome the shortcomings, the present invention provides a self-lock hinge to mitigate or obviate the aforementioned problems.

SUMMARY OF THE INVENTION

The main objective of the present invention is to provide a self-lock hinge to allow the cover to self-lock on the base when closing so that the lock mechanism is not needed. The self-lock hinge is mounted between the cover and the base of the electronic device and has a resilient sleeve and a pintle. The resilient sleeve has a tubular body with a positioning protrusion formed on an inside wall thereof. The pintle has a rod. The rod is mounted rotatably through the tubular body and has a flat wall selectively abutting the positioning protrusion. When the cover is closed relative to the base, the flat wall of the rod abuts the positioning protrusion to lock the cover. Therefore, the cover is self-locked when closing.

Other objectives, advantages and novel features of the invention will become more apparent from the following detailed description when taken in conjunction with the accompanying drawings.

BRIEF DESCRIPTION OF THE DRAWINGS

FIG. 19 is another exploded perspective view of the self-lock hinge in

FIG. 18.

DETAILED DESCRIPTION OF THE PREFERRED EMBODIMENTS

Figure 1:
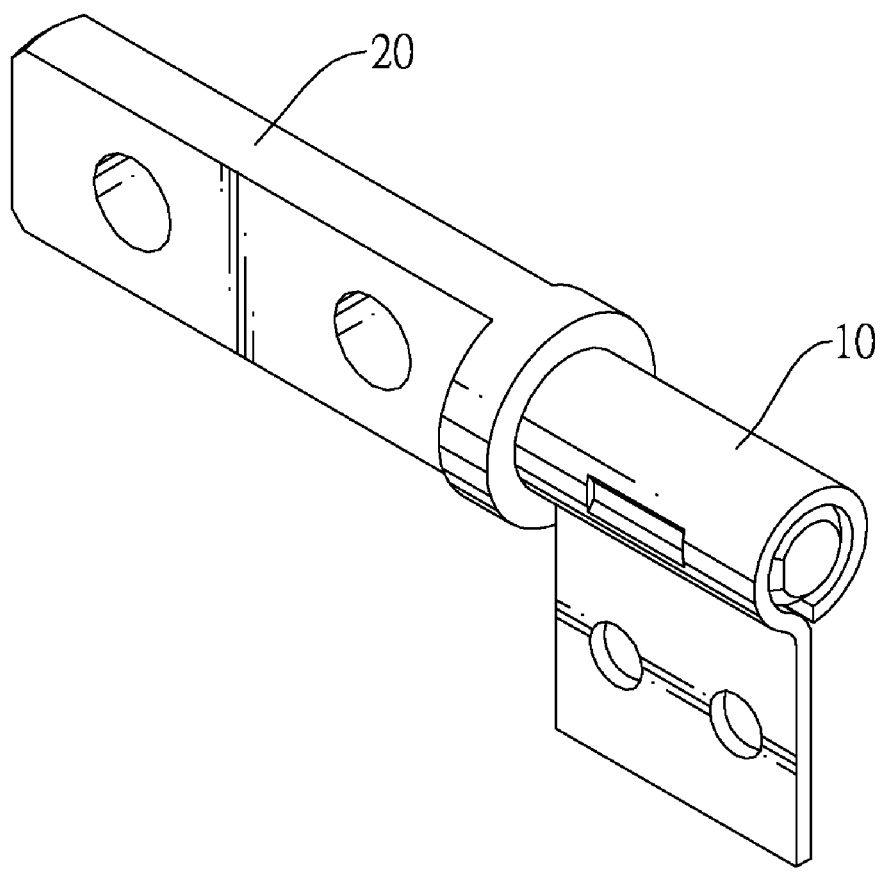
FIG. 1 is a perspective view of a first embodiment of a self-lock hinge in accordance with the present invention.

With reference to FIG. 1, a self-lock hinge in accordance with the present invention comprises a resilient sleeve (10) and a pintle (20).

Figure 2:
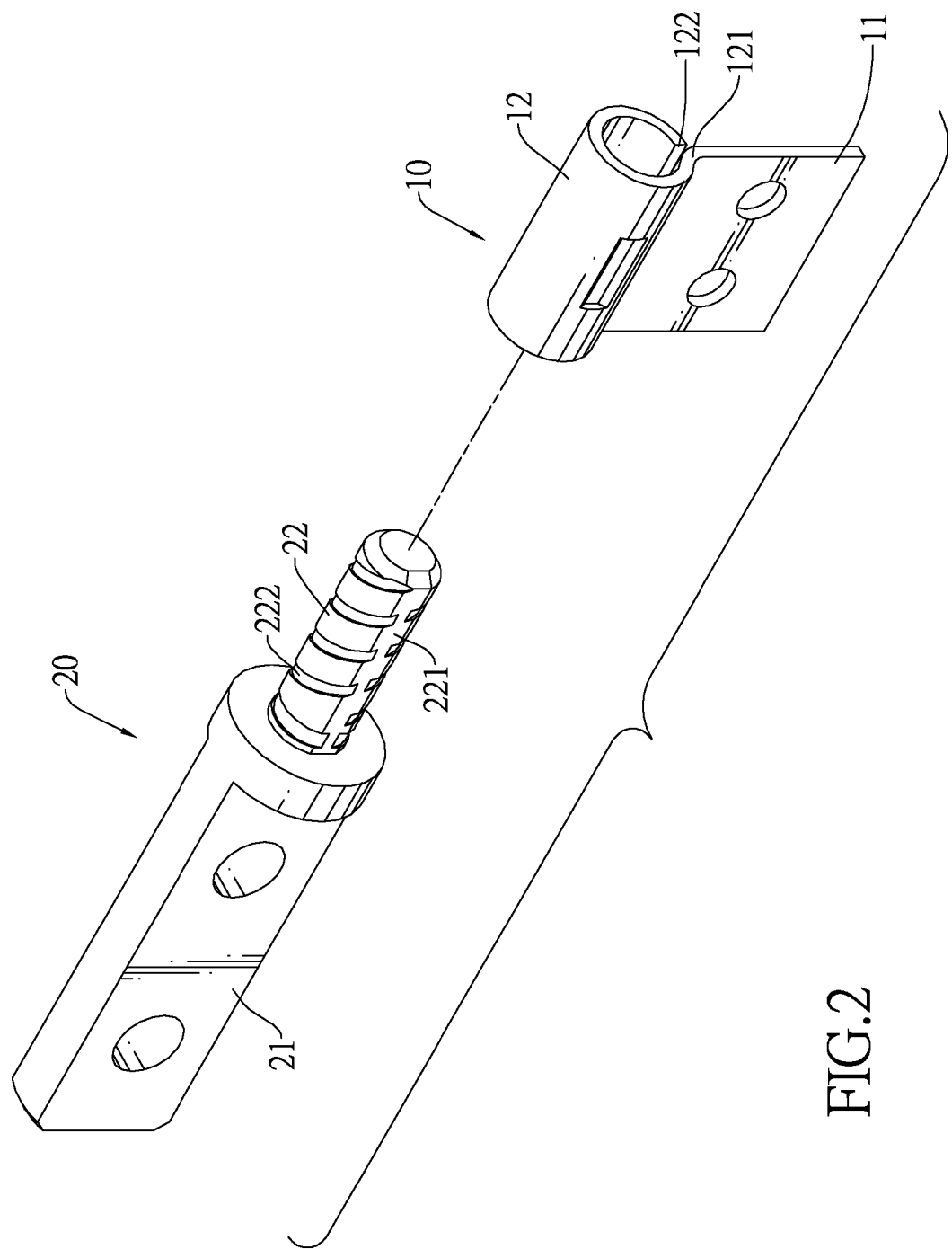
FIG. 2 is an exploded perspective view of the self-lock hinge in FIG. 1.
Figure 3:
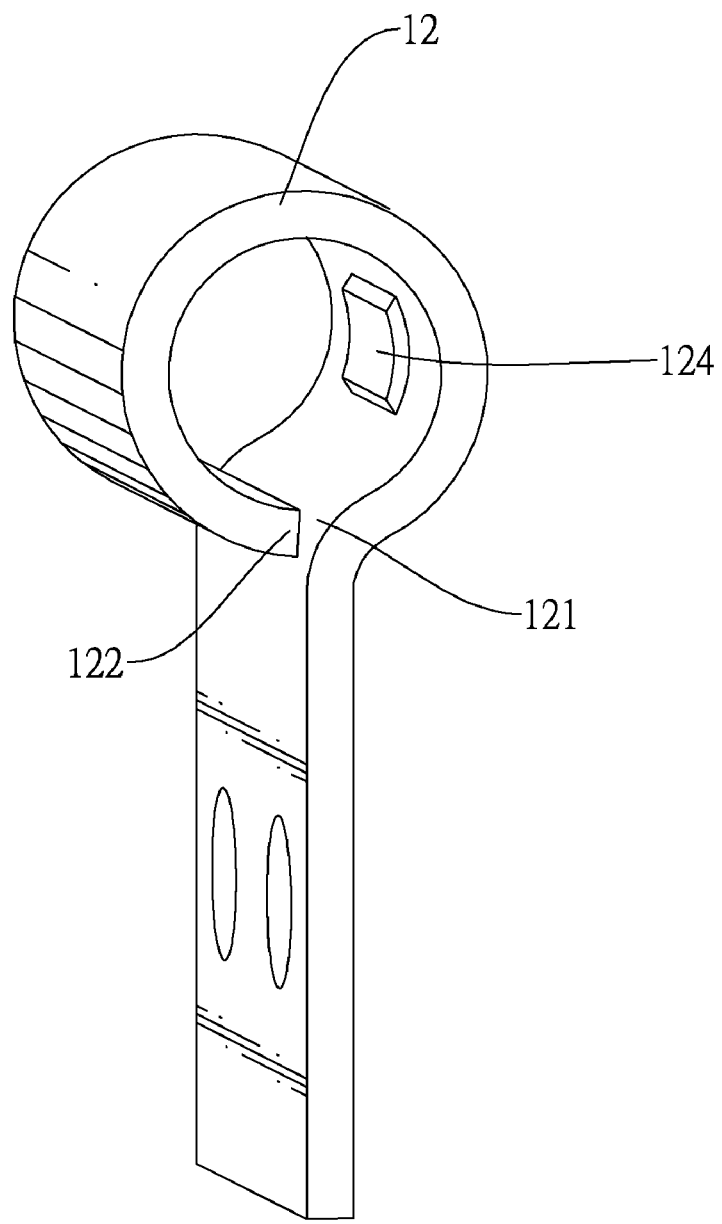
FIG. 3 is an enlarged perspective view of the resilient sleeve of the self-lock hinge in FIG. 1.
Figure 5:
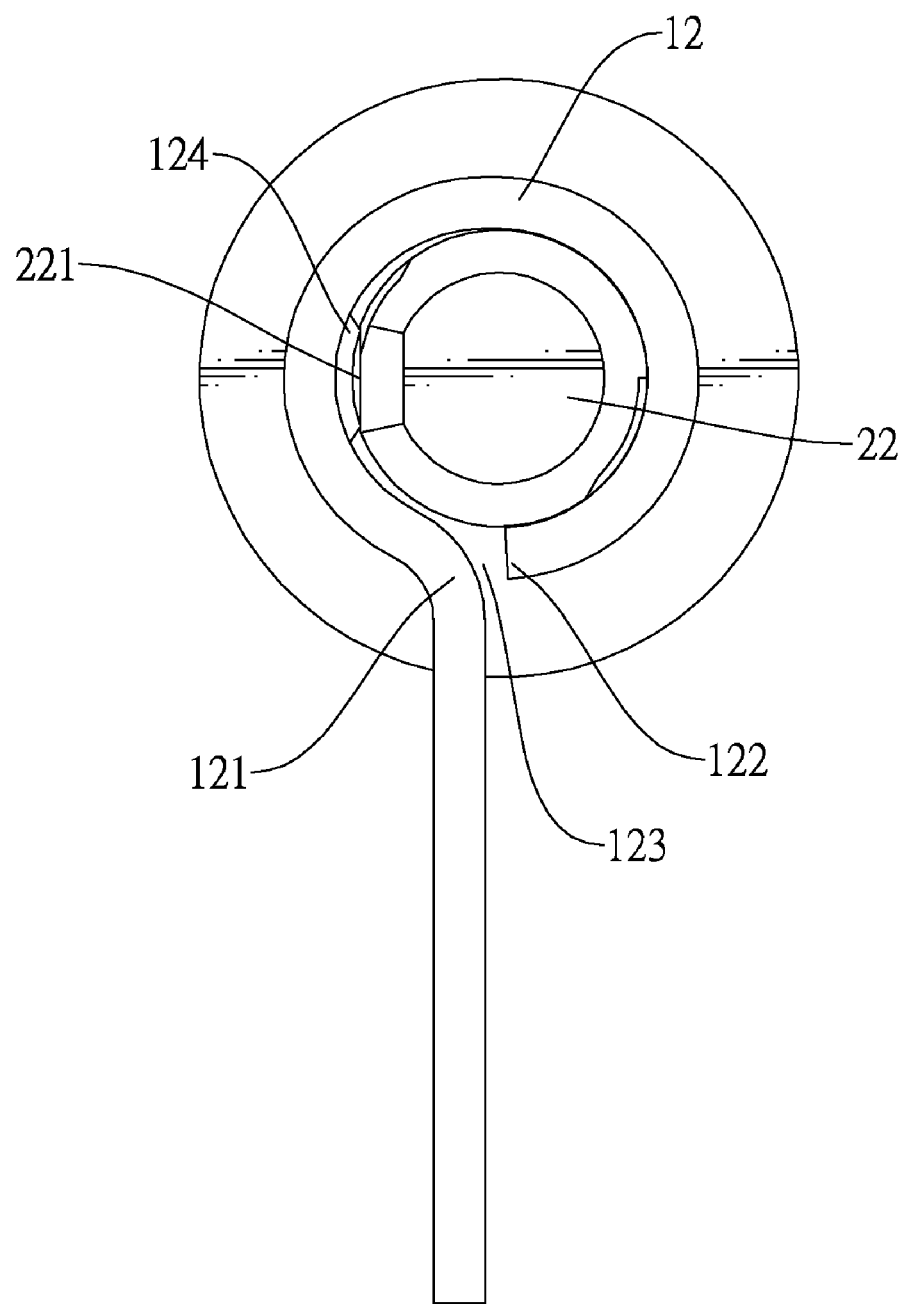
FIG. 5 is an operational end view of the self-lock hinge in FIG. 1, shown closed.
Figure 6:
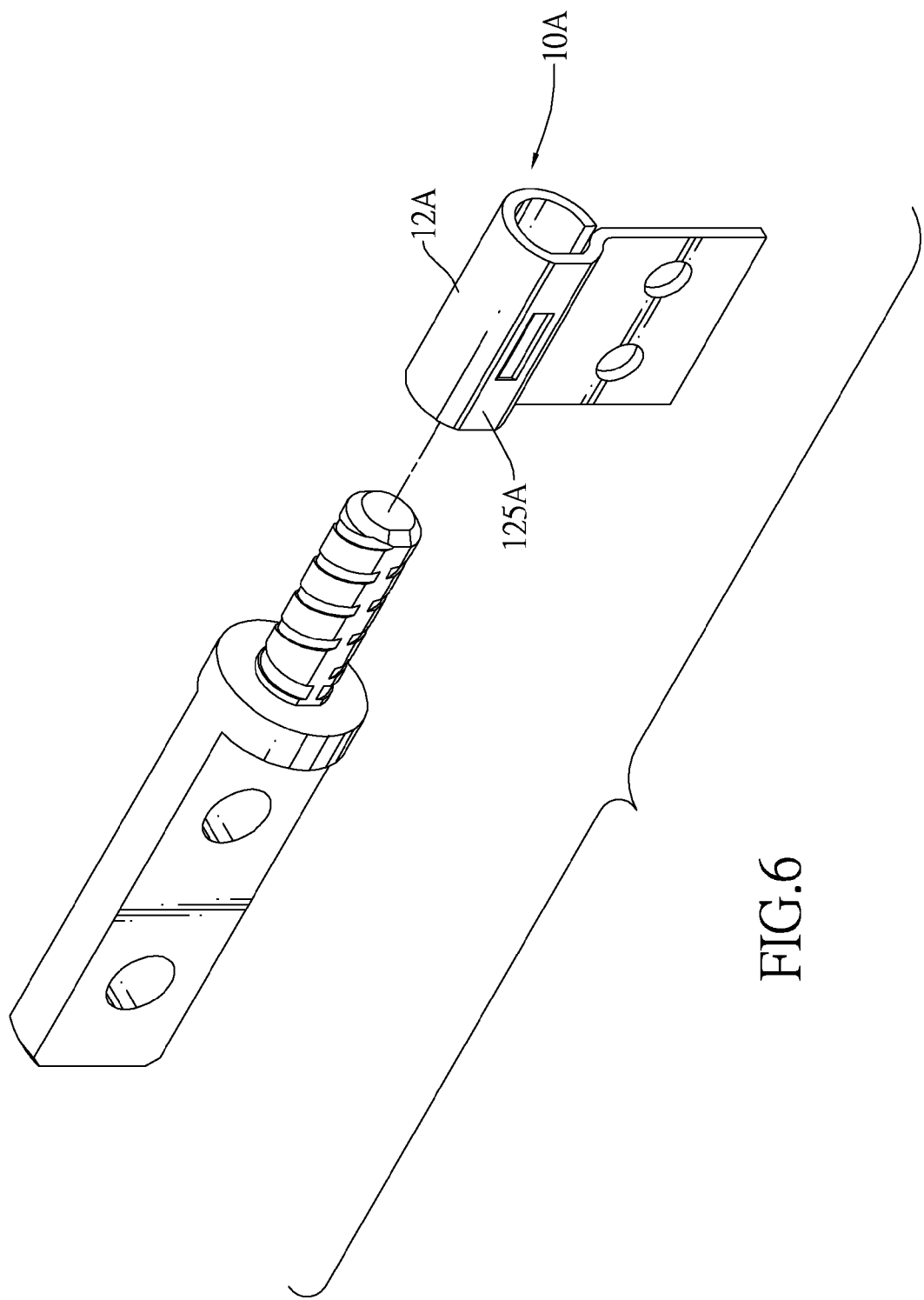
FIG. 6 is an exploded perspective view of a second embodiment of a self-lock hinge in accordance with the present invention.
Figure 7:
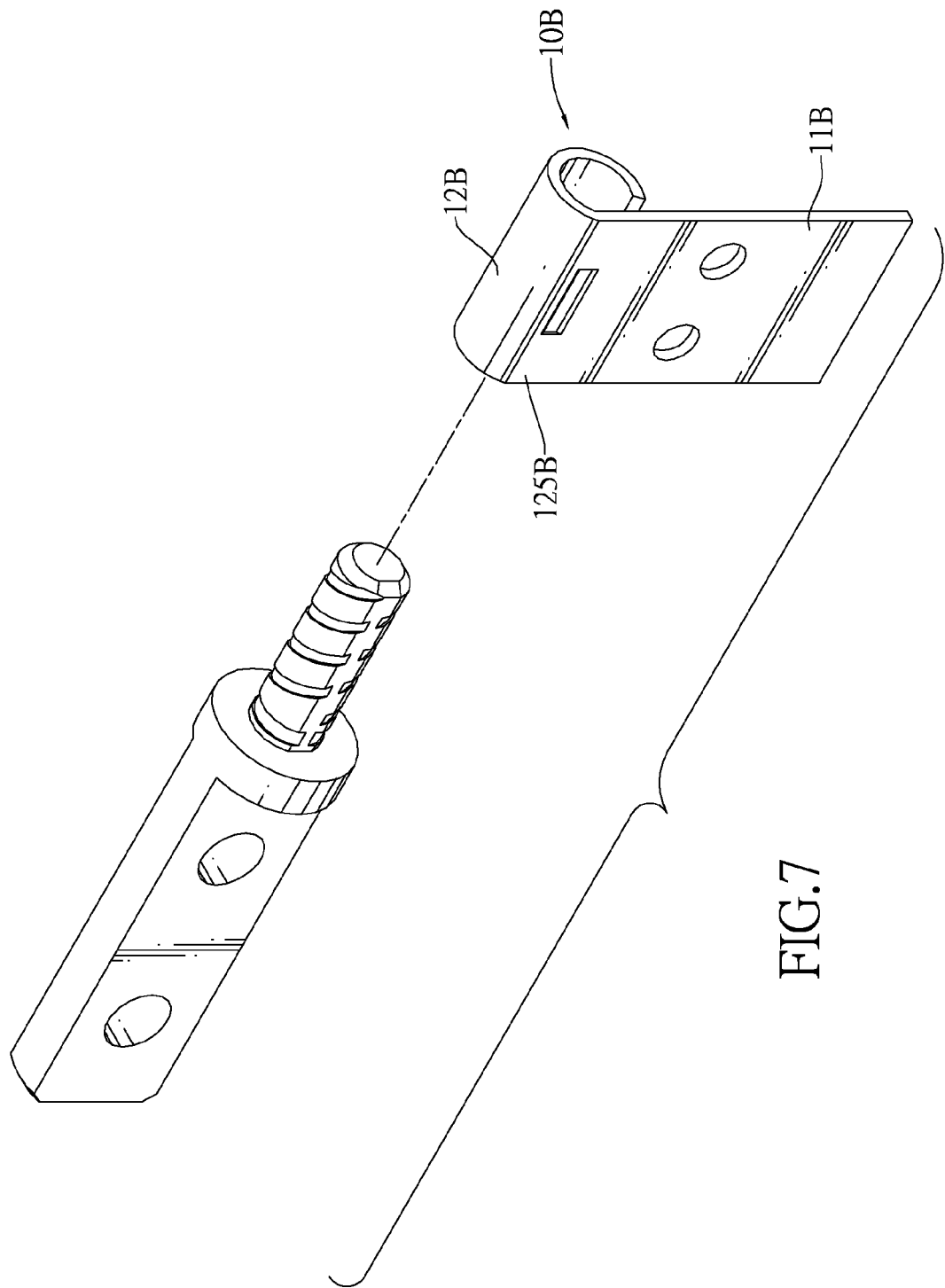
FIG. 7 is an exploded perspective view of a third embodiment of a self-lock hinge in accordance with the present invention.

With reference to FIGS. 2, 3 and 5, the resilient sleeve (10) has an extending wing (11) and a tubular body (12). The tubular body (12) protrudes from a side edge of the extending wing (11) and has a proximal edge (121), a distal edge (122), a slit (123) and a positioning protrusion (124). The proximal edge (121) is connected to the side edge of the extending wing (11). The slit (123) is formed between the proximal and distal edges (121, 122) to allow the tubular body (12) to deform. The positioning protrusion (124) is formed on an inside wall of the tubular body (12) and is formed by recessing from an outside wall of the tubular body (12).

The pintle (20) is connected to the tubular body (12) of the resilient sleeve (10) and has a rod (22) and a fastening segment (21). The rod (22) is mounted rotatably through the tubular body (12) and has a flat wall (221) and a spiral groove (222). The flat wall (221) is formed on an outside wall of the rod (22) and selectively abuts against the positioning protrusion (124) of the tubular body (12). The spiral groove (222) is formed in the outside wall of the rod (22) to accommodate lubricant. The fastening segment (21) protrudes longitudinally from an end of the rod (22).

The self-lock hinge as described is mounted between a cover and a base of an electronic device. The fastening segment (21) of the pintle (20) is connected to the cover. The extending wing (11) of the resilient sleeve (10) is connected to the base. When the cover is pivoted relative to the base, the pintle (20) is rotated relative to the resilient sleeve (10).

Figure 4:
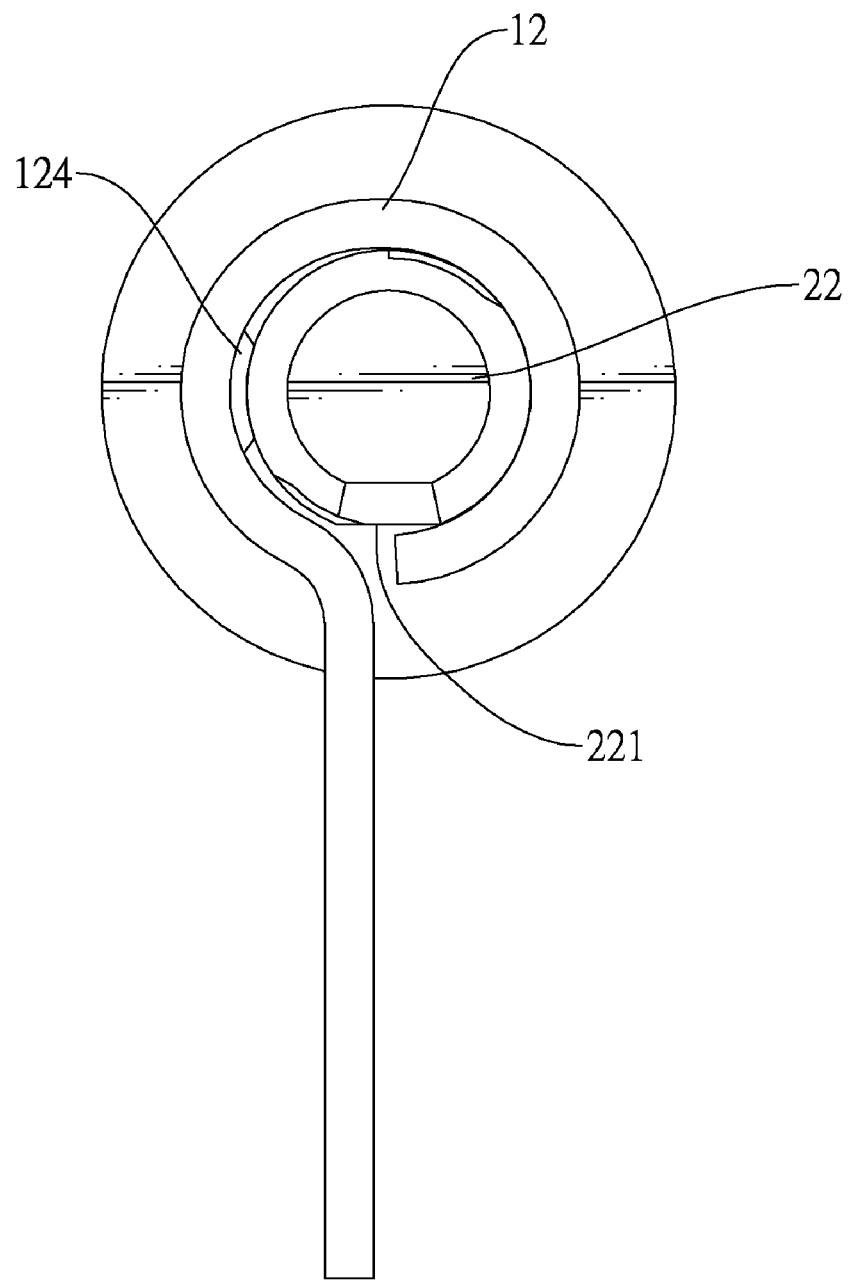
FIG. 4 is an operational end view of the self-lock hinge in FIG. 1, shown opened.

With reference to FIGS. 4 and 5, when the rod (22) of the pintle (20) is rotated relative to the tubular body (12) of the resilient sleeve (10), the outside wall of the rod (22) rubs against the positioning protrusion (124). When the flat wall (221) of the rod (22) abuts against the positioning protrusion (124), the rod (22) is held in position to provide a positioning function so that the cover is locked. By properly assembling the self-lock hinge with the cover and the base, the cover is closed relative to the base when the flat wall (221) of the rod

(22) abuts against the positioning protrusion (124). Therefore, the positioning function locks the cover to remain closed relative to the base.

The self-lock hinge as described has the following advantages. Since the cooperation between the positioning protrusion (124) and the flat wall (221) provides a positioning function, a lock mechanism is not required. Therefore, the cost for the electronic device is reduced, and the electronic device has more room for accommodating the electrical components to provide more functions.

The self-lock hinge in accordance with the present invention has a basic structure as mentioned above. The alternative structures are described below.

In preferred embodiments as shown in FIGS. 6 to 9, 11, 16 and 18, the tubular body (12A, 12B, 12C, 12D, 12E, 12F, 12G) of resilient sleeve (10A, 10B, 10C, 10D, 10E, 10F, 10G) has a flat surface (125A, 125B, 125C, 125D, 125E, 125F, 125G) formed on the outside wall thereof. The positioning protrusion is formed on the flat surface (125A, 125B, 125C, 125D, 125E, 125F, 125G). The flat surface (125B) may align with and may be connected to the extending wing (11B).

Figure 8:
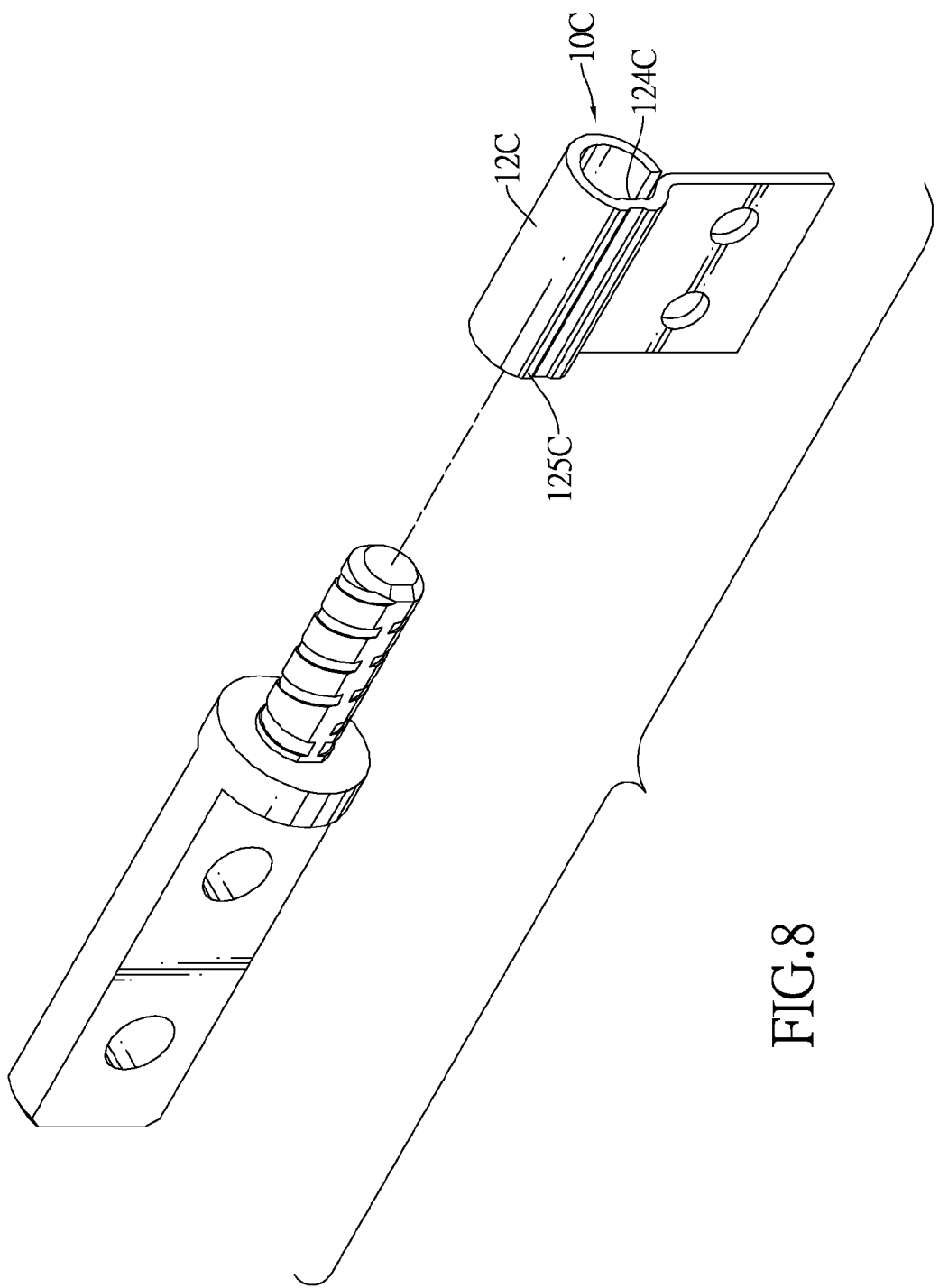
FIG. 8 is an exploded perspective view of a fourth embodiment of a self-lock hinge in accordance with the present invention.
Figure 9:
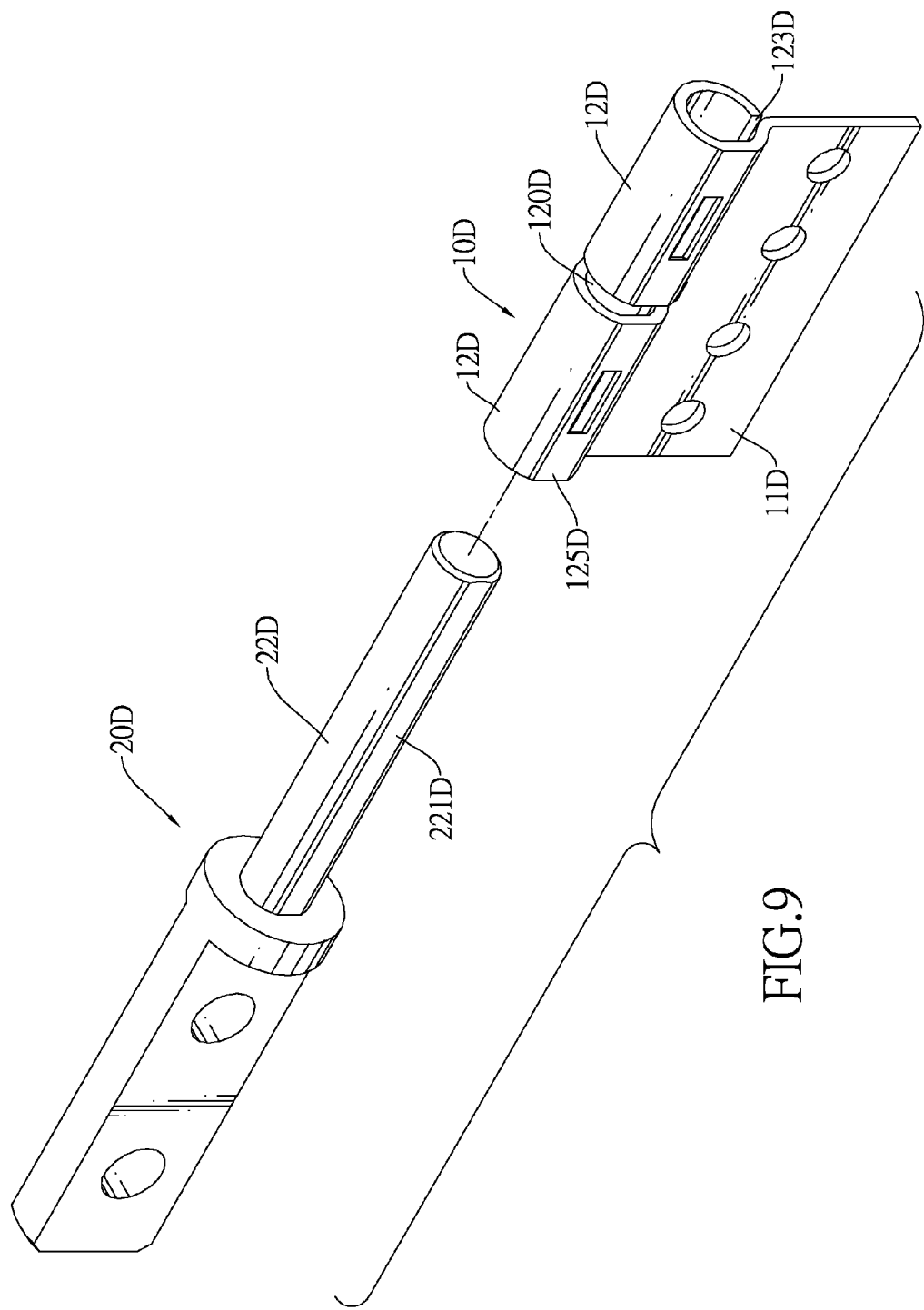
FIG. 9 is an exploded perspective view of a fifth embodiment of a self-lock hinge in accordance with the present invention.
Figure 10:
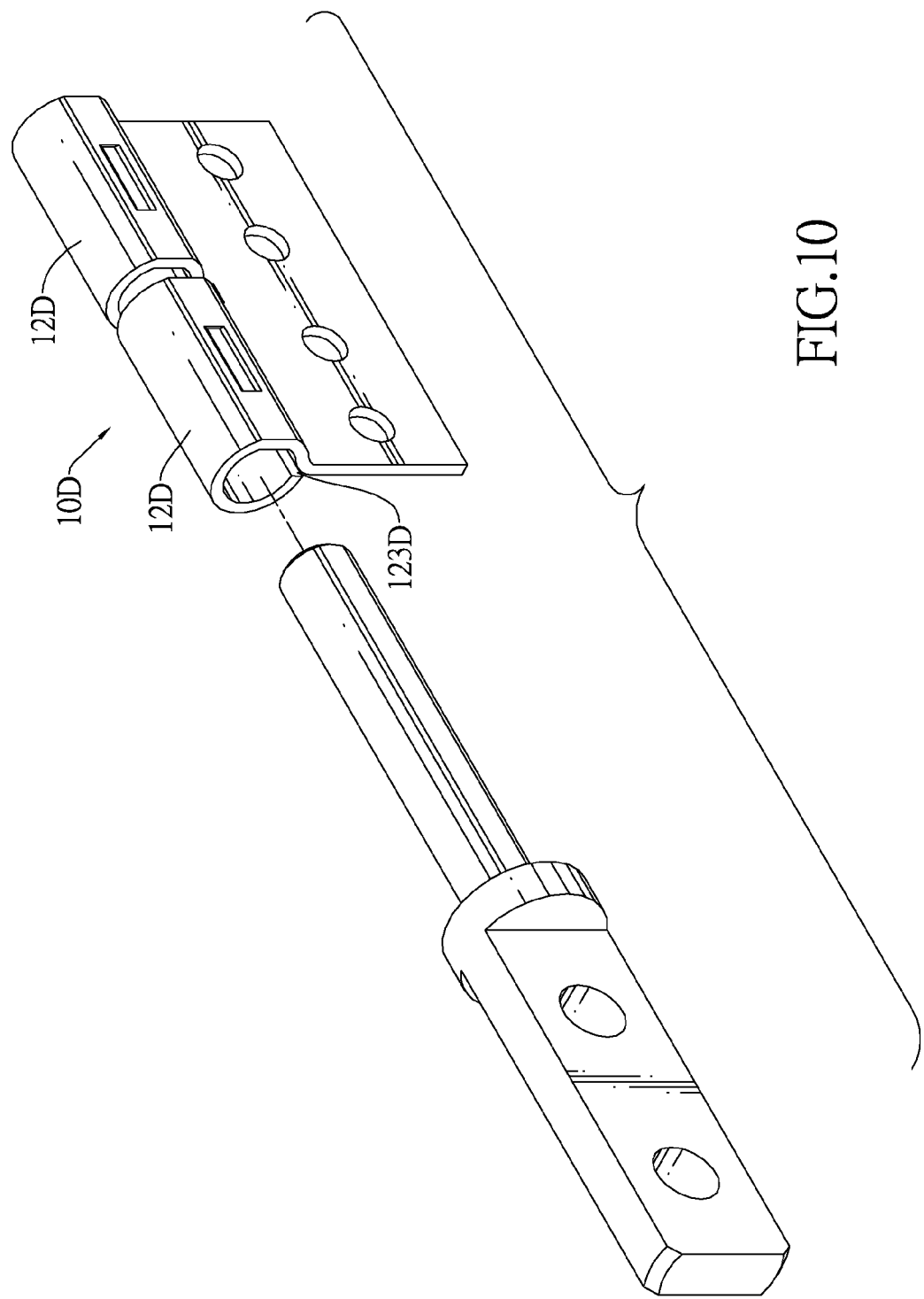
FIG. 10 is another exploded perspective view of the self-lock hinge in FIG. 9.
Figure 11:
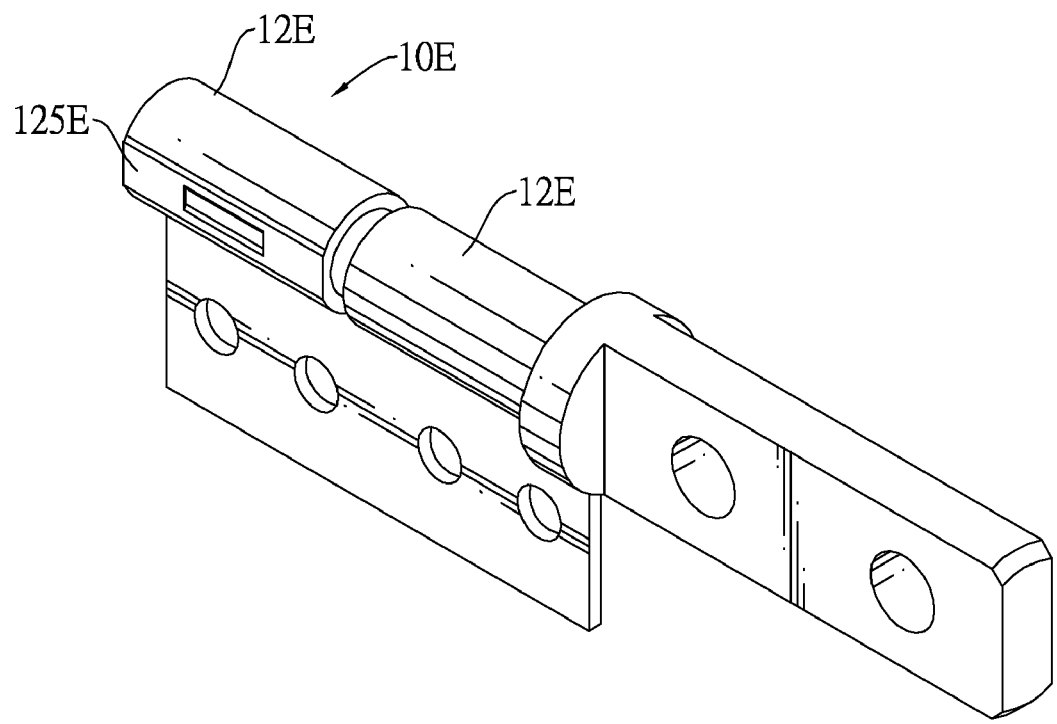
FIG. 11 is a perspective view of a sixth embodiment of a self-lock hinge in accordance with the present invention.
Figure 12:
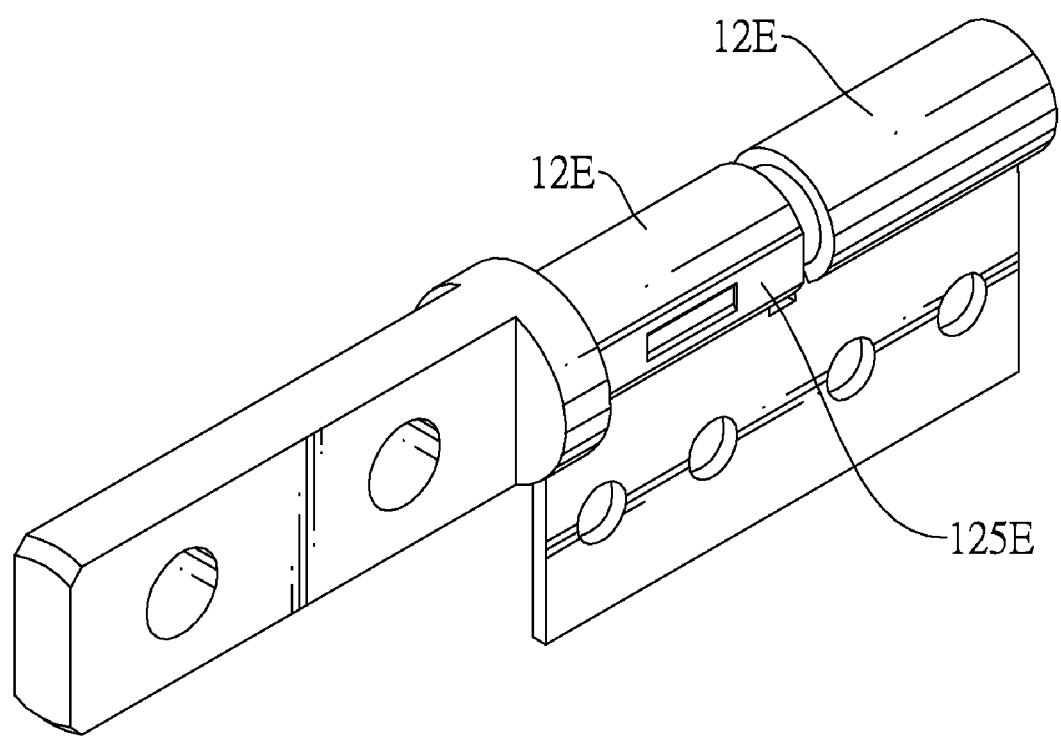
FIG. 12 is another perspective view of the self-lock hinge in FIG. 11.
Figure 13:
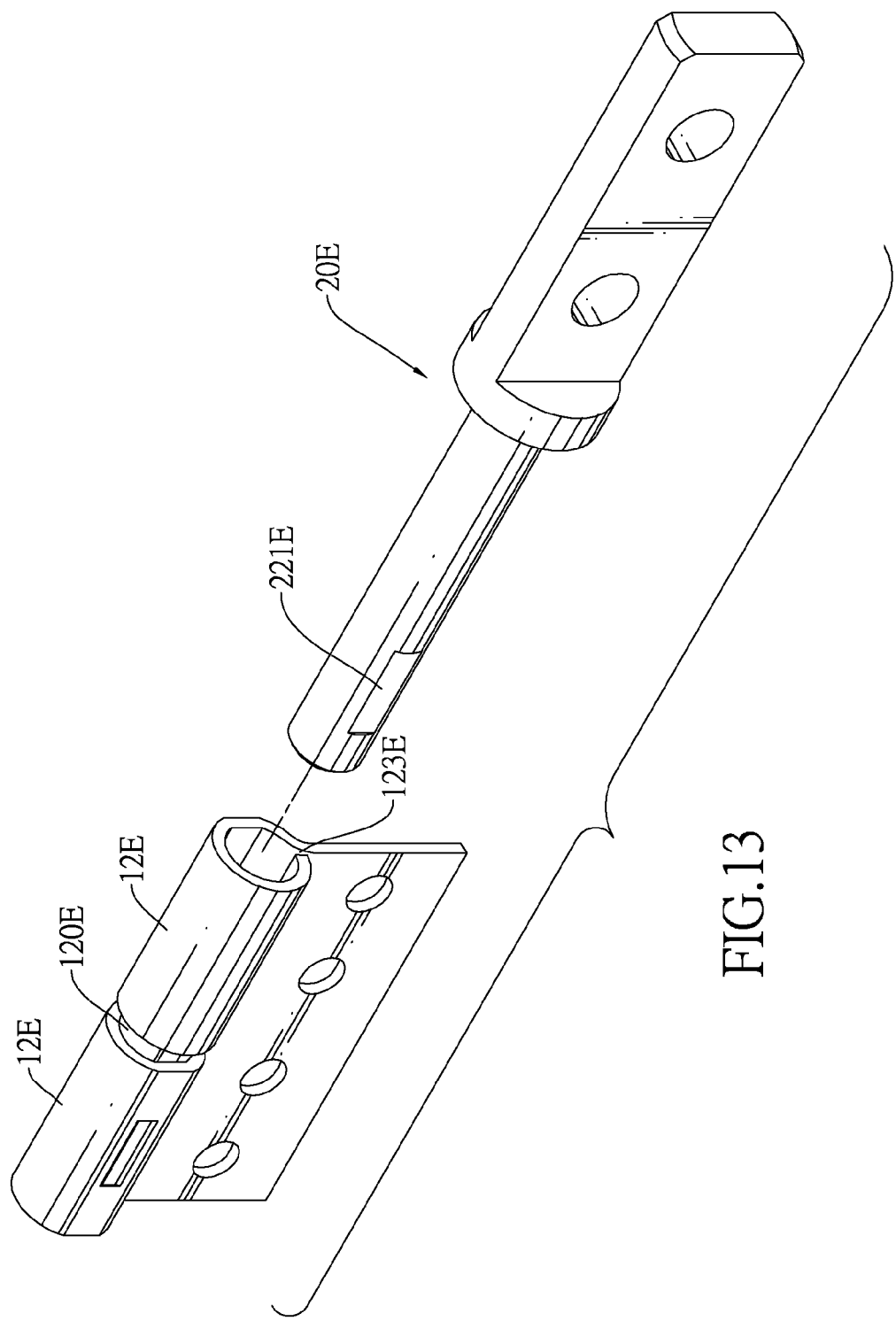
FIG. 13 is an exploded perspective view of the self-lock hinge in FIG. 11.
Figure 14:
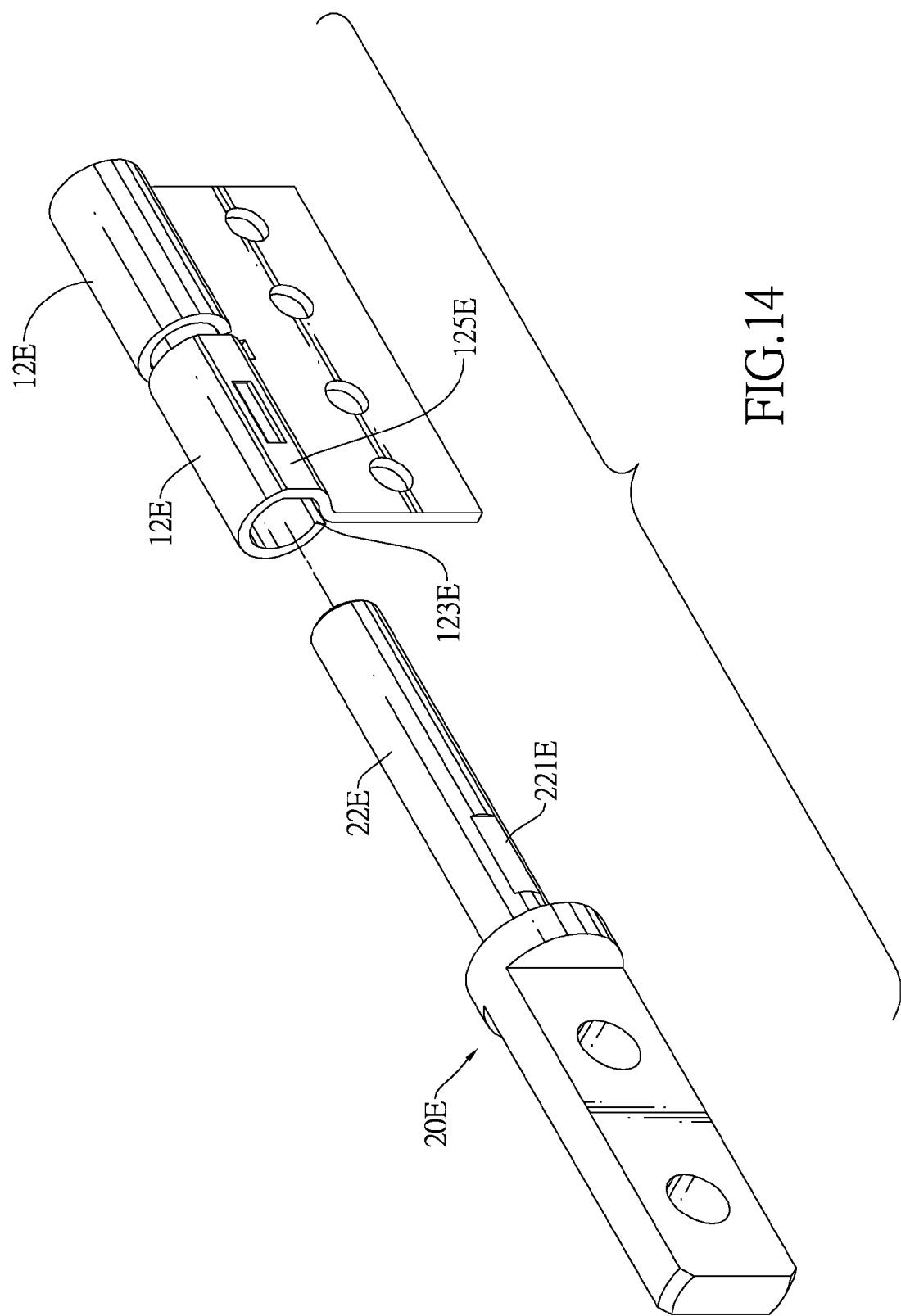
FIG. 14 is another exploded perspective view of the self-lock hinge in FIG. 11.
Figure 15:
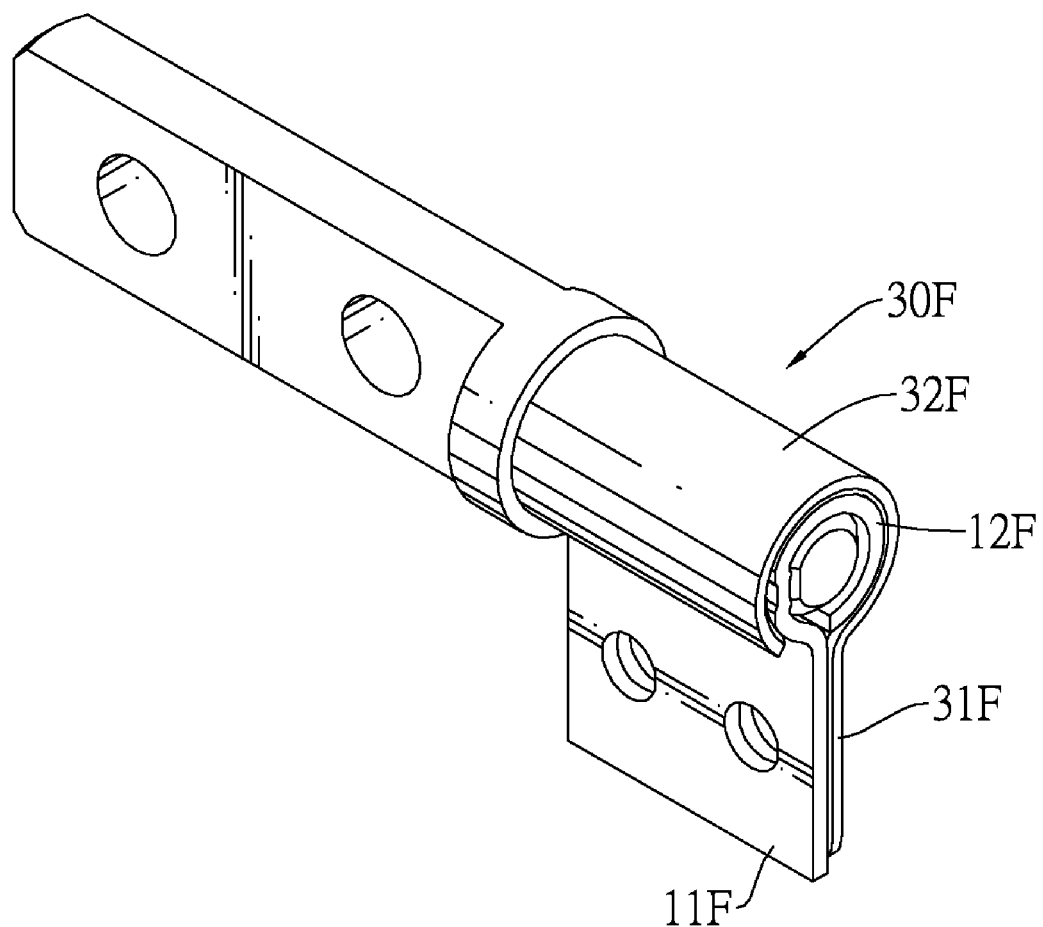
FIG. 15 is a perspective view of a seventh embodiment of a self-lock hinge in accordance with the present invention.
Figure 16:
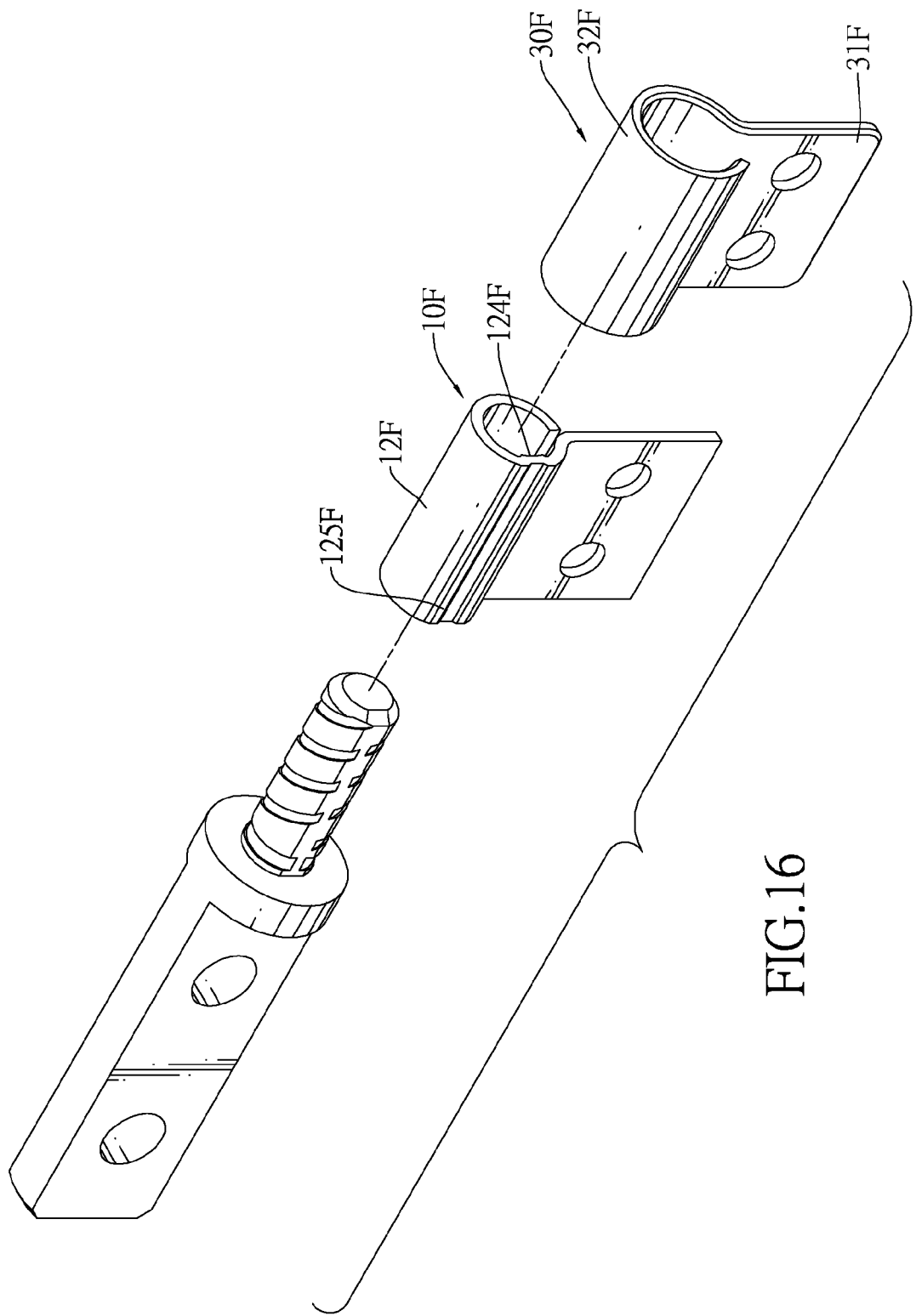
FIG. 16 is an exploded perspective view of the self-lock hinge in FIG. 15.
Figure 17:
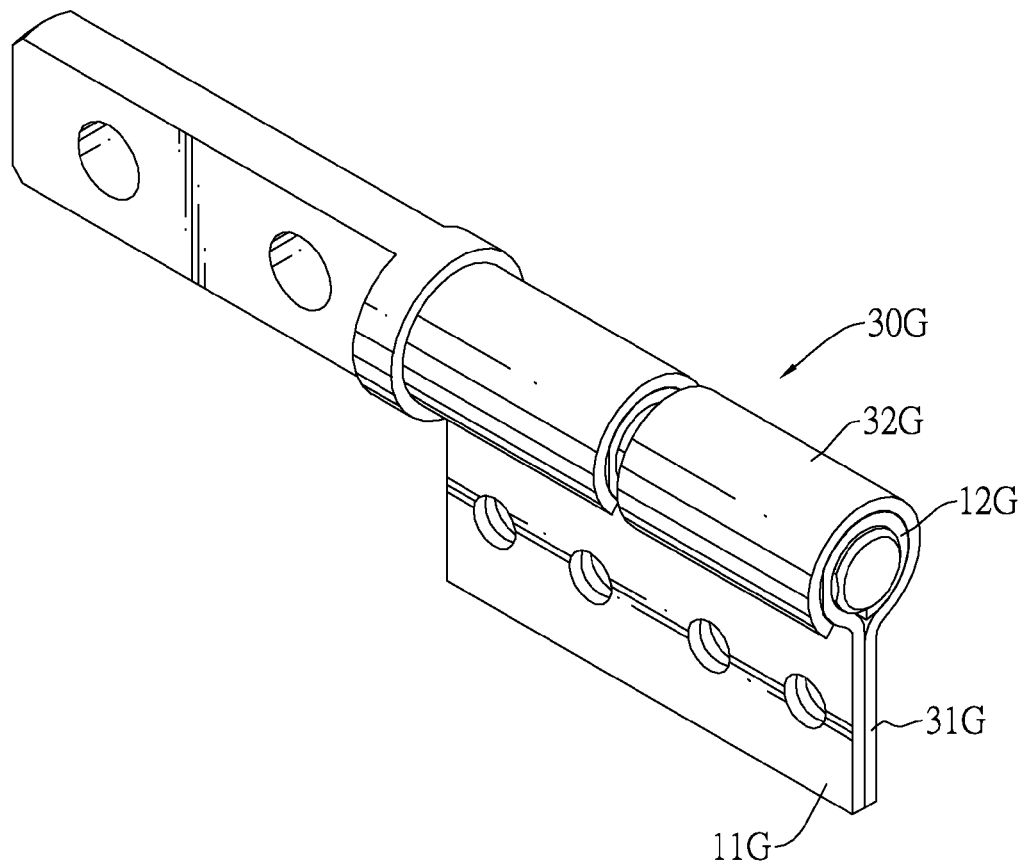
FIG. 17 is a perspective view of an eighth embodiment of a self-lock hinge in accordance with the present invention.
Figure 18:
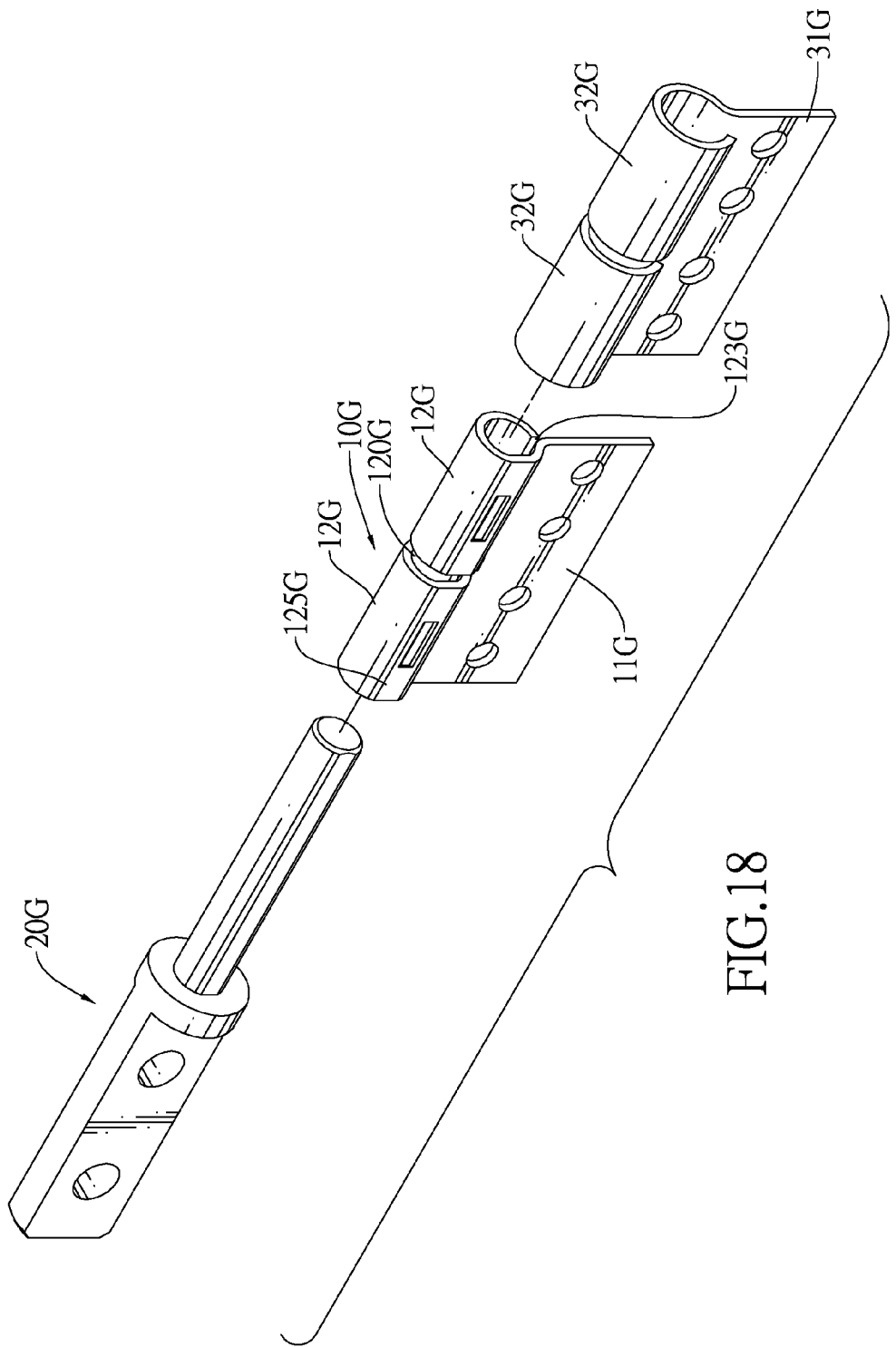
FIG. 18 is an exploded perspective view of the self-lock hinge in FIG. 17.
Figure 19:
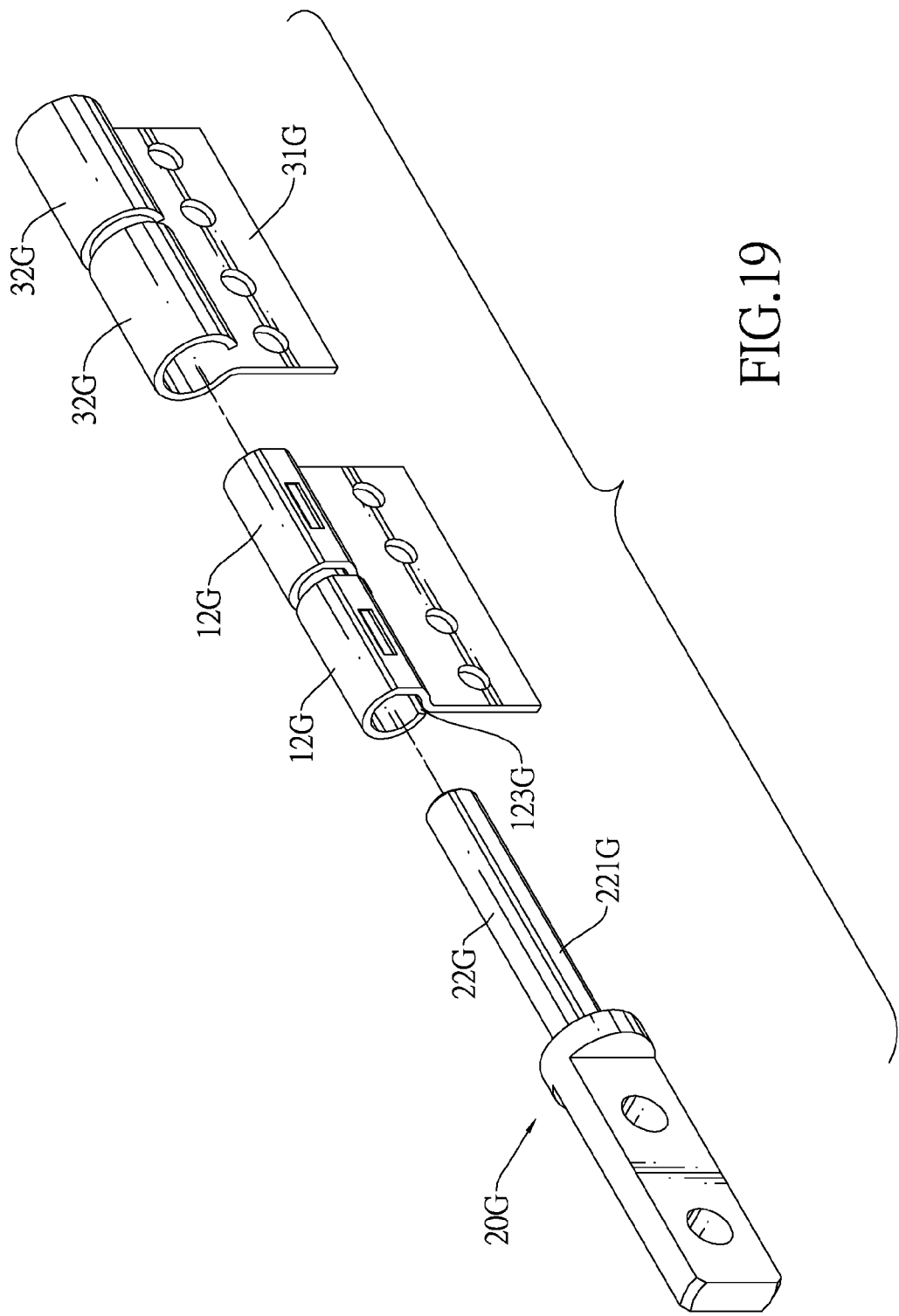

In preferred embodiments as shown in FIGS. 8 and 16, the positioning protrusion (124C, 124F) of the resilient sleeve (12C, 12F) extends longitudinally to end openings of the tubular body (12C, 12F) to increase the abutting area between the flat wall of the rod and the positioning protrusions (124C, 124F).

In preferred embodiments as shown in FIGS. 9 to 14, 18 and 19, the resilient sleeve (10D, 10E, 10G) has two tubular bodies (12D, 12E, 12G) aligning with each other. A gap (120D, 120E, 120G) is formed between adjacent ends of the tubular bodies (12D, 12E, 12G). The tubular bodies (12D, 12E, 12G) may have different forms to change a relation between the slits (123D, 123E, 123G). As an example, the rod (22G) of the pintle (20G) includes a flat wall (221G) to correspond to the slit (123G) of the tubular body (12G).

In preferred embodiments as shown in FIGS. 9, 10, 18 and 19, the tubular bodies (12D, 12G) protrude from the same side edges of the extending wing (11D, 11G) so that the slits (123D, 123G) align with each other. Thus, when the pintle (20D, 20G) rotates clockwise, the tubular bodies (12D, 12G) are extended and provide an elastic force to resist the pintle (20D, 20G) from rotating. Then, the user needs to exert more force to rotate .the pintle (20D, 20G) clockwise. When the pintle (20D, 20G) rotates counterclockwise, the tubular bodies (12D, 12G) are retracted and provide an elastic force to help the pintle (20D, 20G) to rotate. Then, the user rotates the pintle (20D, 20G) counterclockwise using less force. By the predetermined arrangement with the cover and the base of the electronic device, the user may open the cover via less force and close the cover using more force. Furthermore, the positioning protrusions of the tubular bodies (12D, 12G) accordingly align with each other. Further, the rod (22D) of the pintle (20D) has at least one flat wall (221D) to correspond to the flat surface (125D) of the tubular bodies (12D).

In another preferred embodiment as shown in FIGS. 11 to 14, the tubular bodies (12E) protrude from opposite side edges of the extending wing (11E) so that the slits (123E) misalign with each other. Thus, when the pintle (20E) rotates either clockwise or counterclockwise, the tubular bodies (12E) are respectively extended or retracted to balance the torque that the hinge as described provides. Furthermore, the positioning protrusions of the tubular bodies (12E) accordingly misalign with each other. The rod (22E) of the pintle (20E) has two flat walls (221E) formed on opposite sides to correspond to the positioning protrusions of the tubular bodies (12E).

In preferred embodiments as shown in FIGS. 15 to 19, the self-lock hinge comprises an outer sleeve (30F, 30G). The outer sleeve (30F, 30G) has a fastening wing (31F, 31G) and at least one tubular body (32F, 32G). The fastening wing (31F, 31G) is attached to the extending wing (11F, 11G) of the resilient sleeve (10F, 10G). The tubular body (32F, 32G) protrudes from a side edge of the fastening wing (31F, 31G) and is mounted tightly around the tubular body (12F, 12G) of the resilient sleeve (10F, 10G) to enhance the resilient force.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A self-lock hinge comprising:
   a resilient sleeve having
      an extending wing; and
      a tubular body protruding from a side edge of the extending wing and having
         a proximal edge connected to the side edge of the extending wing;
         a distal edge;
         a slit formed between the proximal and distal edges; and
         a positioning protrusion formed on an inside wall of the tubular body and formed by recessing from an outside wall of the tubular body;
   a pintle connected to the tubular body of the resilient sleeve and having
      a rod mounted rotatably through the tubular body and having
         an outside wall rubbing against the positioning protrusion of the tubular body; and
         a flat wall formed on the outside wall of the rod and selectively abutting against the positioning protrusion of the tubular body; and
      a fastening segment protruding longitudinally from an end of the rod; and
   an outer sleeve having
      a fastening wing attached to the extending wing of the resilient sleeve; and
      a tubular body protruding from a side edge of the fastening wing and mounted tightly around the tubular body of the resilient sleeve.

2. The self-lock hinge as claimed in claim 1, wherein
   the tubular body of the resilient sleeve has a flat surface formed on the outside wall thereof; and
   the positioning protrusion is formed on the flat surface.

3. The self-lock hinge as claimed in claim 2, wherein the positioning protrusion of the resilient sleeve extends longitudinally to two end openings of the tubular body.

4. The self-lock hinge as claimed in claim 2, wherein the flat surface of the tubular body aligns with and is connected to the extending wing.

5. The self-lock hinge as claimed in claim 1, wherein the positioning protrusion of the resilient sleeve extends longitudinally to two end openings of the tubular body.

6. The self-lock hinge as claimed in claim 1, wherein the resilient sleeve further comprise another tubular body and a gap is formed between adjacent ends of the two tubular bodies.

7. The self-lock hinge as claimed in claim 6, wherein
the tubular bodies protrude from same side edges of the extending wing;
the slits of the tubular bodies align with each other; and
the positioning protrusions of the tubular bodies align with each other.

8. The self-lock hinge as claimed in claim 7, wherein each tubular body of the resilient sleeve has a flat surface formed on the outside wall thereof; and the positioning protrusion of each tubular body is formed on the flat surface of the tubular body.

9. The self-lock hinge as claimed in claim 8 with the outer sleeve having
another tubular body protruding from a side edge of the fastening wing and mounted tightly around the resilient sleeve.

10. The self-lock hinge as claimed in claim 6, wherein the tubular bodies protrude from opposite side edges of the extending wing; the slits of the tubular bodies misalign with each other; the positioning protrusions of the tubular bodies misalign with each other; and the rod of the pintle further has another flat wall, the two flat walls of the rod are formed on opposite sides to correspond to the positioning protrusions of the tubular bodies.

11. The self-lock hinge as claimed in claim 10, wherein each tubular body of the resilient sleeve has a flat surface formed on the outside wall thereof; and the positioning protrusion of each tubular body is formed on the flat surface of the tubular body.

12. The self-lock hinge as claimed in claim 1, wherein the rod of the pintle has a spiral groove formed in the outside wall of the rod.

* * * * *